(12) United States Patent
Schuler et al.

(10) Patent No.: US 7,688,208 B2
(45) Date of Patent: Mar. 30, 2010

(54) MONITORING FOR RADIO FREQUENCY ENABLED ITEMS BASED ON SHARED GROUP ACTIVITY PROFILES

(75) Inventors: Francesca Schuler, Des Plaines, IL (US); Krishna D. Jonnalagadda, Algonquin, IL (US); Xun Luo, Cicero, IL (US)

(73) Assignee: Motorola, Inc., Schaumburg, IL (US)

( * ) Notice: Subject to any disclaimer, the term of this patent is extended or adjusted under 35 U.S.C. 154(b) by 365 days.

(21) Appl. No.: 11/740,634

(22) Filed: Apr. 26, 2007

(65) Prior Publication Data

US 2008/0266093 A1  Oct. 30, 2008

(51) Int. Cl.
G08B 13/14 (2006.01)
(52) U.S. Cl. .............. 340/572.1; 340/573.1; 340/568.1; 340/5.2; 340/825.49; 340/10.1; 705/1; 705/16; 705/17; 705/18; 705/67
(58) Field of Classification Search ............... 340/572.1, 340/573.1, 5.2, 10.1, 825.49; 705/1, 16, 705/67, 17, 18; 70/571
See application file for complete search history.

(56) References Cited

U.S. PATENT DOCUMENTS

| | | | |
|---|---|---|---|
| 5,979,757 A | 11/1999 | Tracy et al. | |
| 6,108,685 A | 8/2000 | Kutzik et al. | |
| 6,375,077 B1 | 4/2002 | Hankins | |
| 6,424,264 B1 * | 7/2002 | Giraldin et al. | 340/573.1 |
| 6,602,191 B2 | 8/2003 | Quy | |
| 6,605,038 B1 | 8/2003 | Teller et al. | |
| 6,774,811 B2 * | 8/2004 | Kaufman et al. | 340/825.49 |
| 7,140,542 B2 | 11/2006 | Andreasson et al. | |
| 7,295,116 B2 * | 11/2007 | Kumar et al. | 340/572.1 |
| 2002/0019586 A1 | 2/2002 | Teller et al. | |
| 2002/0079368 A1 | 6/2002 | Hankins | |
| 2002/0147629 A1 | 10/2002 | Alsafadi et al. | |
| 2004/0073482 A1 | 4/2004 | Wiggens et al. | |
| 2004/0185881 A1 * | 9/2004 | Lee et al. | 455/466 |

(Continued)

FOREIGN PATENT DOCUMENTS

EP  1522949 A1  4/2005

(Continued)

OTHER PUBLICATIONS

WIPO, ISA/KR, "PCT International Search Report and Written Opinion," Aug. 29, 2008.

(Continued)

*Primary Examiner*—George A Bugg
*Assistant Examiner*—Sisay Yacob

(57) ABSTRACT

A method, radio frequency ID reader, and wireless communication device monitor radio-frequency identification enabled items associated with a group activity. The method includes receiving a set of radio frequency IDs representing a set of radio frequency ID enabled items (110) to be monitored. The set of radio frequency enabled items (110) are associated with at least one group activity. Each radio frequency ID enabled item (110) is determined to be associated with one of an individual and a group of individuals. The method also includes determining if at least one condition associated with the group activity has occurred indicating that the group activity is occurring (1004). The set of radio frequency IDs representing the set of radio frequency ID enabled items (110) is monitored for in response to determining that the at least one condition is occurring.

20 Claims, 9 Drawing Sheets

U.S. PATENT DOCUMENTS

| | | |
|---|---|---|
| 2004/0198555 A1 | 10/2004 | Anderson et al. |
| 2005/0065971 A1 | 3/2005 | Honda |
| 2005/0093698 A1* | 5/2005 | Sakamoto et al. ........ 340/572.1 |
| 2005/0216126 A1 | 9/2005 | Koselka et al. |
| 2005/0250458 A1 | 11/2005 | Graham et al. |
| 2005/0285739 A1 | 12/2005 | Velhal et al. |
| 2006/0205359 A1 | 9/2006 | Brooks |
| 2006/0205564 A1 | 9/2006 | Peterson |
| 2006/0229504 A1 | 10/2006 | Johnson |
| 2007/0257768 A1 | 11/2007 | Bowers et al. |

FOREIGN PATENT DOCUMENTS

| | | |
|---|---|---|
| JP | 2004-258914 A | 9/2004 |
| JP | 2007-004615 A | 1/2007 |
| KR | 10-0706914 B1 | 4/2007 |

OTHER PUBLICATIONS

Bradbury, "Dumbing Down A Smartwatch," Wired News, Nov. 29, 2004, http://www.wired.com/news/technology/0,1282,65721,00.html.

"Tagalert help you keep track of personal stuff," RFID Gazette (Journal), Mar. 20, 2006.

Vigoda, et al., "TouchTags: Using Touch to Retrieve Information Stored in a Physical Object," MIT, 2 pages, http:// www.media.mit.edu/physics/publications/papers/99.01touchtag.rtf.

* cited by examiner

| TASK | ITEM | SHARED | ASSIGNED | ... |
|---|---|---|---|---|
| BRING TENT | TENT | Y | MEMBER 2 | ... |
| BRING SNACKS | | Y | ORIGINATOR | . |
| | TOOTHBRUSH | N | ORIGINATOR | . |
| | LANTERN | Y | MEMBER 2 | . |
| | KEYS | Y | MEMBER 3 | . |
| | WALLET | N | ORIGINATOR | . |
| | RADIO | Y | MEMBER 3 | . |
| | ... | ... | . | . |

FIG. 2

CAMPING ACTIVITY PROFILE

| TASK | ITEM | SHARED | ASSIGNED | ... |
|---|---|---|---|---|
| BRING TENT | TENT | Y | MEMBER 2 | ... |
| BRING SNACKS | | Y | ORIGINATOR | ... |
| | LANTERN | Y | MEMBER 2 | ... |
| | KEYS | Y | MEMBER 3 | ... |
| | RADIO | Y | MEMBER 3 | ... |
| | CELLPHONE | N | MEMBER 2 | ... |
| | SWEATSHIRT | N | MEMBER 2 | ... |

| GROUP ITEM | STATUS |
|---|---|
| TENT | DETECTED |
| SNACKS | DETECTED |
| LANTERN | DETECTED |
| KEYS | NOT DETECTED |
| ⋮ | ⋮ |

*FIG. 4*

| INDIVIDUAL ITEMS | DETECTION STATUS |
|---|---|
| TOOTH BRUSH | DETECTED |
| WALLET | DETECTED |
| ⋮ | ⋮ |

*FIG. 5*

| ITEMS | DETECTION STATUS |
|---|---|
| TENT | DETECTED |
| SNACKS | DETECTED |
| LANTERN | DETECTED |
| KEYS | NOT DETECTED |
| WALLET | DETECTED |
| TOOTH BRUSH | DETECTED |
|  |  |

FIG. 6

MONITORING FOR RADIO FREQUENCY ENABLED ITEMS BASED ON SHARED GROUP ACTIVITY PROFILES

CROSS-REFERENCE TO RELATED APPLICATIONS

This application is related to applications entitled "Monitoring For Radio Frequency Enabled Items Based On Activity Profiles", U.S. patent application Ser. No. 11/616,621, "Dynamic Updating Of Product Profiles For Active Lifestyles," U.S. patent application Ser. No. 11/616,645, and "Active Lifestyle Management", U.S. patent application Ser. No. 11/616,636, which were filed on Dec. 27, 2006 and are commonly assigned herewith to Motorola, Inc. These related applications are incorporated herein by reference in their entirety.

FIELD OF THE INVENTION

The present invention generally relates to the field of radio frequency identification, and more particularly relates to monitoring for radio frequency enabled items and activities.

BACKGROUND OF THE INVENTION

Radio frequency identification ("RFID") is used to automatically identify and track RFID enabled items. RFID systems utilize RFID tags that are placed on the object to be monitored. For example, a shipping company can place RFID tags on its boxes to monitor and identify each box. One problem with some current RFID systems is that the RFID reader, the device that receives radio frequency ("RF") signals from the RFID tags, needs to be carried by the user. If a user forgets the RFID reader, the tracking benefits of the RFID system are lost.

Other RFID systems utilize stationary RFID readers. In these systems the readers are generally setup to generate an audible alarm when a reader detects an RFID tag. These systems cannot notify a user if an item has been forgotten or left behind. Furthermore, current RFID systems are constantly monitoring for RFID enabled items. In other words, current RFID systems do not allow a user to customize the monitoring of RFID. The constant monitoring unnecessarily wastes battery life of the RFID reader.

Furthermore, current RFID systems do not offer group activity monitoring. For example, in group activities such as camping, travel, skiing, etc. individuals share the responsibility of bringing certain items with them and completing certain tasks associated with the group activity. However, current RFID systems do not provide a means of tracking these items and tasks within a group atmosphere. If one member of the group forgets an item, the remaining members of the group are not notified.

Therefore a need exists to overcome the problems with the prior art as discussed above.

SUMMARY OF THE INVENTION

Briefly, in accordance with the present invention, disclosed are a method, RFID reader, and wireless communication device for monitoring radio-frequency identification enabled items associated with a group activity. The method includes receiving a set of radio frequency IDs representing a set of radio frequency ID enabled items to be monitored. The set of radio frequency enabled items are associated with at least one group activity. Each radio frequency ID enabled item is determined to be associated with one of an individual and a group of individuals. The method also includes determining if at least one condition associated with the group activity has occurred indicating that the group activity is occurring. The set of radio frequency IDs representing the set of radio frequency ID enabled items is monitored for in response to determining that the at least one condition is occurring.

In another embodiment, radio frequency ID reader for monitoring radio-frequency ID enabled items associated with a group activity is disclosed. The radio-frequency ID reader includes a memory and a processor that is communicatively coupled to the memory. A radio-frequency ID management module is communicatively coupled to the memory and the processor. The radio-frequency ID management module adapted to receiving a set of radio frequency IDs representing a set of radio frequency ID enabled items to be monitored. The set of radio frequency enabled items are associated with at least one group activity. Each radio frequency ID enabled item is determined to be associated with one of an individual and a group of individuals. The radio-frequency ID management module is also adapted to determining if at least one condition associated with the group activity has occurred indicating that the group activity is occurring. The set of radio frequency IDs representing the set of radio frequency ID enabled items is monitored for in response to determining that the at least one condition is occurring.

In yet another embodiment, a wireless communication device for monitoring radio-frequency ID enabled items associated with a group activity is disclosed. The wireless communication device includes a memory and a processor that is communicatively coupled to the memory. A radio-frequency ID management module is communicatively coupled to the memory and the processor. The radio-frequency ID management module adapted to receiving a set of radio frequency IDs representing a set of radio frequency ID enabled items to be monitored. The set of radio frequency enabled items are associated with at least one group activity. Each radio frequency ID enabled item is determined to be associated with one of an individual and a group of individuals. The radio-frequency ID management module is also adapted to determining if at least one condition associated with the group activity has occurred indicating that the group activity is occurring. The set of radio frequency IDs representing the set of radio frequency ID enabled items is monitored for in response to determining that the at least one condition is occurring.

One of the advantages of the present invention is that a RFID monitoring system is provided that can manage and monitor group activities and RFID enabled items associated with the activities. Members of a group activity can each be assigned items associated with the activity. These items, in one example, are RFID enabled and are monitored by RFID sensors. The RFID sensors monitor for the presence of the RFID enabled items and can either display or transmit to a group member the status of the items. Therefore, the status of group items that are shared by the group can be displayed to each group member in real-time. Another advantage of the present invention is that a member of a group can elect to share an individual item, which can transition into a group item if group members elect to monitor that item. For example, group member 1 brings sun tanning lotion and wants the other group members to know he/she is bringing it. The other group members can choose to monitor or not monitor the sun tanning lotion. If another group member decides to monitor the sun tanning lotion, this item is now designated as a group item.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 shows one example of a group activity profile according to an embodiment of the present invention;

FIG. 3 shows another example of a group activity profile according to an embodiment of the present invention;

FIG. 4 shows one example of a user interface according to an embodiment of the present invention;

FIG. 5 shows another example of a user interface according to an embodiment of the present invention;

FIG. 6 shows yet another example of a user interface according to an embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Wireless Communications System

Figure 1:
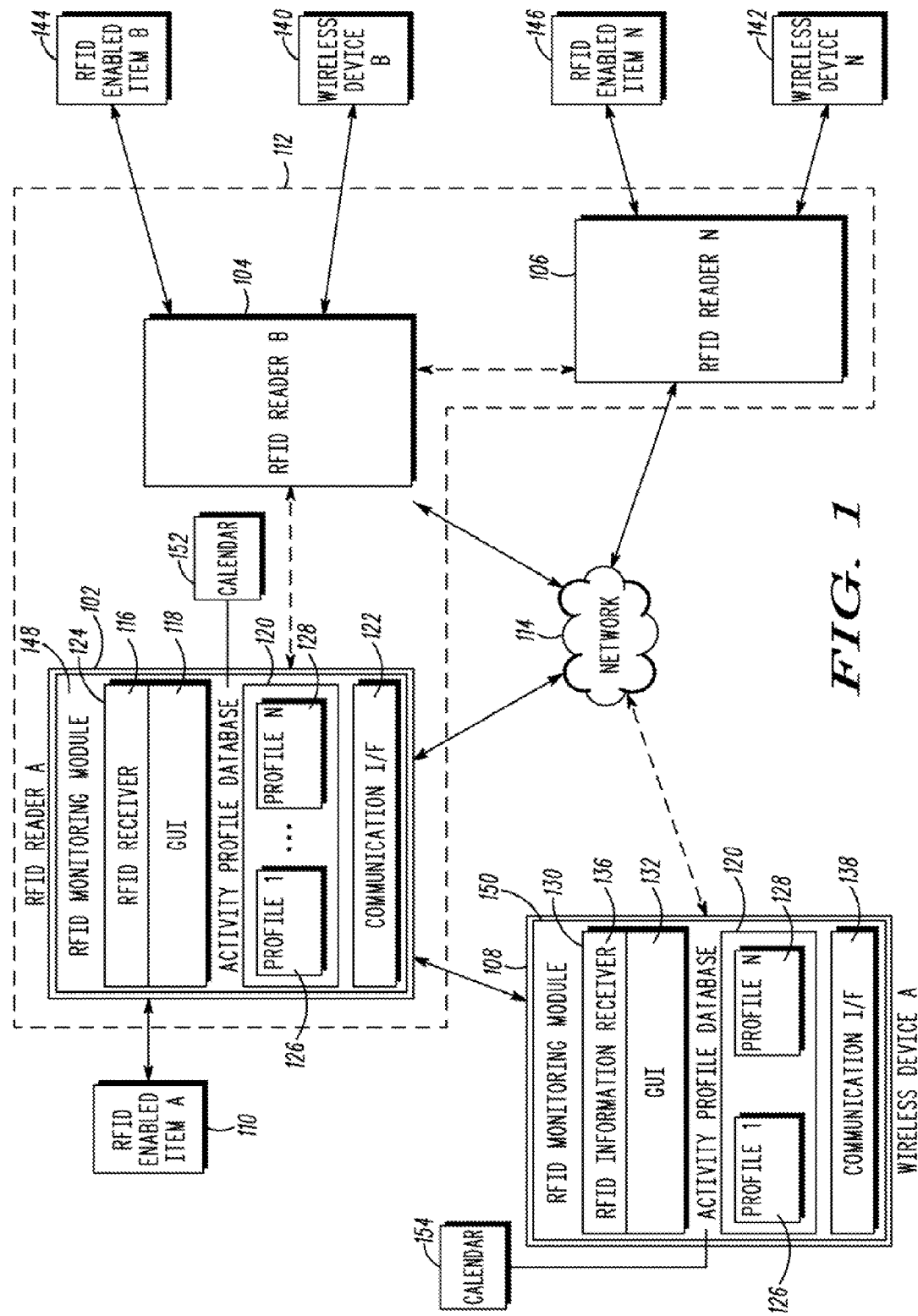
FIG. 1 is a block diagram illustrating a RFID system according to an embodiment of the present invention.

FIG. 1 illustrates one example of an RFID system 100 for tracking RFID enabled items according to an embodiment of the present invention. The RFID system 100 includes one or more RFID readers 102, 104, 106 communicatively coupled to one or more wireless devices 108. The RFID readers 102 detect the presence of one or more RFID enabled items 110, 144, 146, which are any items coupled to an RFID tag. In one embodiment, the RFID readers 102 comprise a distributed network 112 of RFID readers. In other words, the RFID readers 102 communicate information relating to RFID enabled items 110, activity profiles 126, 128, and the like between one another. In another embodiment, each RFID reader 102 acts independent of other RFID readers 102.

The RFID readers 102, in one embodiment, are communicatively coupled to each other via a network 114, which can either be wired (e.g., Ethernet or the like) or wireless (e.g., 802.11, 802.16 or the like). In another embodiment, the RFID readers 102 communicate directly with each other through a direct communication technology such as Bluetooth, Infrared Data Access ("IrDA") technologies, RF, or the like. The RFID readers 102 can be fixed at any location desired by a user. For example, a user may have an RFID reader 110 situated at doorway, in a car, in an office, in a briefcase, or any other place that a user desires.

The RFID readers 102 shown in FIG. 1, in one embodiment, are associated with a single user. In another embodiment, one or more of the RFID readers 102 are associated each associated with separate users. For example, the RFID reader A 102 can be associated with a first user, RFID reader B 104, can be associated with a second user, and RFID reader C can be associated with a third user.

The wireless devices 108, 140, 142, in one example, are communicatively coupled to the RFID readers 102, 104, 106 via the network 114. In another example, the wireless devices 108, 140, 142 communicate directly with each RFID reader 102, 104, 106 through a direct communication technology such as Bluetooth, Infrared Data Access ("IrDA") technologies, RF, or the like. Therefore, the RFID readers 102, 104, 106 and the wireless devices 108, 140, 142 can communicate with one another via Short Messaging Service ("SMS") protocols, Near-Field Communication ("NFC") protocols, Bluetooth, Redundant Internet Protocol and General Packet Radio Service channels, and the like.

In one embodiment, the wireless devices 108, 140, 142 of FIG. 1 are associated with a single user. In another embodiment, one or more of the wireless devices 108, 140, 142 are each associated with a separate user. For example, wireless device A 108 can be associated with a first user, wireless device B 140 can be associated with a second user, and wireless device C 142 can be associated with a third user.

A wireless device, for example, and not for any limitation, can include any one or a combination of the following: mobile telephones, smart phones, text messaging devices, handheld computers, pagers, beepers, wireless communication cards, or the like. A smart phone is a combination of 1) a pocket PC, handheld PC, palm top PC, or Personal Digital Assistant (PDA), and 2) a mobile telephone. More generally, a smartphone. It should be noted that other electronic devices such as an information center (e.g., car radio) within a car can also be communicatively coupled to the RFID readers 102 for displaying information related to RFID enabled items 110.

The RFID system 100 allows for the tracking and monitoring of RFID enabled items 110 with respect to various activities. For example, RFID enabled items 110 can be associated with an activity, wherein the RFID readers 102 detect if all items associated with that activity are present. In one embodiment, each RFID reader 102 includes an RFID monitoring module 124, activity profile database 120, and a communication interface 122. The RFID monitoring module 124 includes an RFID receiver 116, which includes all hardware and software components for detecting RFID enabled items 110 as should be known to those of ordinary skill in the art.

The RFID monitoring module 124 also includes a GUI 118 that provides a user interface for displaying information associated with detected RFID enabled items 110. For example, the GUI 118 can display an identifier associated with the detected item. The GUI 118 also allows a user to enter information associated with RFID enabled items 110 at the RFID reader 102. For example, a user can associate RFID items 110 with specific activities such as leaving for work, vacation, camping, a sporting event, and the like through the GUI 118. Also, a single event can have more than one profile associated with it. The activities can be either individual activities where the use is the only participant or group activities where two or more users are participating. It should be noted that the GUI 118 is optional and not every RFID reader 102 needs to include a GUI. The GUI 118 is discussed in greater detail below.

The activity profile database 120 includes one or more profiles 126, 128 associated with an activity for which RFID enable items 110 are to be monitored. For example, a user can define a profile for an activity such as camping that includes various items such as a tent, canteen, lantern, and the like. As the RFID reader 102 begins monitoring items for the "camping" activity, it cross references the profile with detected items to determine if all items are present. An activity can be an individual activity such as "pick up dry cleaning" or a group activity such as "camping". Therefore, the activity profiles 126, 128 can either be individual activity profiles and/or group activity profiles.

The RFID reader 102 can then alert a single user or members of a group activity if all items associated with the activity are present or if items are missing. This information can be displayed to a user or group member through the GUI 118 of the RFID reader(s) 102 or sent to the wireless device 108 associated with the user via the communication interface 122. Additionally, a profile 126 can also include an identifier for one or more RFID readers 102 that are to monitor a particular activity and/or items. For example, a user can designate an RFID reader 102 situated in a trunk of a car or in a garage to monitor for "camping" activity items.

The wireless device 108, in one embodiment, includes an RFID information module 130 comprising an RFID information receiver 136 for receiving RFID related information from a RFID reader 102. For example, a wireless device 108 can receive activity profiles 126 from the RFID reader 102, item list updates, prompts, and the like. The information is received via a communication interface 134 such as Bluetooth or IrDA, as discussed above. The received information is displayed to the user via a GUI 132. The user can also enter information associated with RFID enabled items 110 through the GUI 132. For example, a user can enter profile information, RFID identifier information and the like through the wireless device GUI 132. Any information displayed to a user at an RFID reader 102 can also be displayed to a user at the wireless device through the wireless device GUI 132.

The wireless device 108 can also include an RFID monitoring module that monitors for RFID enabled items similar to that discussed above with respect to the RFID reader 102. The RFID monitoring module, in this example, can also include the RFID information module 130. It should be noted that the activity profile database 120 can reside on a remote system (not shown) instead of at the RFID reader 102. In this example, the RFID reader 102 syncs with the remote system to retrieve activity profiles. Also, each RFID reader 102 in the RFID system 100 can include an activity profile database 120 or a single RFID reader 102 can include a central activity profile database 120 used by all coupled RFID readers 102. In yet another example, the activity profiles 126 can reside on the wireless device 108 and be transmitted to any of the RFID readers 102. The activity profiles 126 are discussed in greater detail below.

In another example, an activity profile 126 does not need to be predefined. For example, an RFID reader 102 can detect one or more RFID enabled items 110 and prompt a user to create an activity profile with the detected items. This prompting can occur at the RFID reader 102 or the RFID reader 102 can prompt the user through the GUI 132 of the wireless device 108.

Group Activity RFID Monitoring Example

The following is one example illustrating RFID monitoring according to the present invention. It should be noted that these example are only illustrative and do not limit the present invention in any way. The present invention is applicable to any environment where a user desires to monitor for RIFD enabled items. The following example is directed towards monitoring RFID enabled items associated with a group activity. An example of RFID monitoring for an individual activity is discussed in the commonly owned application entitled "Monitoring For Radio Frequency Enabled Items Based On Activity Profiles", U.S. patent application Ser. No. 11/616,621.

In this example, a first user (referred to as the "originating group member" from hereon in) creates a group activity such as "camping" either at an RFID reader 102 or on a wireless device 108 associated with the originating member. For example, the RFID reader 102 can include a user interface, keypad, and the like that allows a user to enter activity information. The originating member can enter an activity ID (e.g., a name associated with the activity), RFID enabled items to be tracked and monitored, tasks associated with the activity, time/location information, group members, and the like. Alternatively, the originating member can enter this information on the wireless device 108 associated with the originating member. In this example, the wireless device 108 then communicates the group activity information to one or more RFID readers 102 setup by the originating member.

The group activity information entered by the first group member is stored in the activity profile database 120 as an activity profile 126. However, if a "camping" group activity already exists in the activity profile database 120 the originating group member can be given the option of updating the existing activity profile or creating a new activity profile. In another embodiment, the originating member creates a "camping" activity entry within a calendar residing on the wireless device 108 or the RFID reader 102. The originating member can also create a "camping" activity on an information processing system communicatively coupled to the wireless device 108 and/or the RFID reader 102.

The RFID management module 148, 150 residing either at the wireless device 108 or the RFID reader 102 monitors the calendar 152, 154 and identifies the "camping" activity entry. The RFID management module 148, 150 then automatically generates a list of RFID enabled items to be tracked and monitored for the camping activity. The list can be generated based on items that the originating member has associated with the "camping" activity entry or based on "camping"

activity history. For example, an activity profile 126 can already exist for "camping". This profile can include previous items associated with the activity and the member responsible for each item. The user can also customize the list by adding and/or deleting items to be tracked.

Once the group activity is created/updated, the other group members that were associated with the camping activity are invited. For example, the user can manually enter contact information for each group member or associated the contact information with the activity profile. The RFID reader 102 uses this information to send invite information to RFID readers 104, 106 and/or the wireless devices 140, 142 associated with the other group members. For example, as discussed above, the RFID readers 102, 104, 106 can be communicatively coupled to a network. Therefore, the RFID reader 102 of the first group member can communicate invite information to the RFID readers 104, 106 associated with the other group members. Alternatively, contact information for group members can be centrally located in a database communicatively coupled to the RFID readers 102, 104, 106.

Once the RFID readers 104, 106 of the other group members receive the invite information, the group members are then notified either by their respective RFID reader or by their respective wireless device 140, 142. For example, the RFID readers 102, 104, 106 are able to audibly and/or visually notify users of a group activity invite. The RFID readers 102, 104, 106 can also transmit group activity invite information to the wireless device(s) 104, 106 associated with the group members.

The invited group members can then either accept or decline the invitation to the camping activity. In one embodiment, each invited group member is also shown a list of invitees associated with the group activity. If an invited group member accepts the invitation, the camping activity profile information is stored in the activity profile database of the group member. However, if a "camping" activity already exists in the activity profile of the group member, the existing profile can be automatically updated or a new profile can be created. In one embodiment, the camping activity profile information is sent along with the invitation, but is only accessible if the invitation is accepted. In another embodiment, the camping activity profile information is only transmitted to the group member after the invitation is accepted. Each group member is notified when another group member accepts or declines an invitation.

In another example, the group activity information created by the originating group member and the group activity invite can be sent to the other members via the wireless device 108 associated with the originating group member. For example, as discussed above, the first group member can enter group activity information at the wireless device 108. This information and the invite can be transmitted to the RFID reader(s) 102, 104, 106 associated with the originating group member and the other group members via the wireless device 108 of the originating group member. The group activity information and the invite can also be directly sent to the wireless devices 140, 142 of the other group members via the wireless device 108 of the first group member.

It should be noted that the invite to a group activity does not need to be transmitted to the other group members immediately following the creation of the activity. For example, the first group member can create the group activity and store the activity within the activity profile database. At a point later in time, the RFID management module 148, 150 monitors an activity organizing application such as a calendar 152, 154 and determines that the camping activity is starting within a predefined time frame. The calendar 152, 154 can also make this determination and notify the RFID management module 148, 150. An invite can then be sent out to the other group members. Advanced notice can vary based on activity (part of application or calendar intelligence.

In one embodiment, if the originating group member associated a list of items with the camping activity, the originating group member can pre-select select items that he/she is responsible for. For example, if the originating group member associated a lantern, tent, canteen, radio, cooler, and the like with the camping activity, the originating group member can choose the lantern and radio as his/her responsibility. The activity profile 126 associated with the camping activity is updated to reflect this selection. When the camping activity information (i.e., the camping activity profile) is transmitted to the other group members, the other group members can see that the originating group member is responsible the lantern and radio.

In another embodiment, the RFID management module 148, 150 discussed above can assign group members to particular items or tasks when it generates the item list, which is part of the activity profile 126 associated with the camping activity. For example, this pre-assignment can be automatically performed by the RFID management module 148, 150 based on "camping" activity history (i.e., the "camping" activity profile specifies which member was assigned to what item in the past). The RFID management module 148, 150 can also prompt the originating member to select a member to be assigned to an item.

In another embodiment, the list of RFID enabled items to be monitored for the camping activity is not pre-defined. Each group member can add items to or remove items from the RFID enabled item list once the member accepts the invitation to the "camping" activity. It should be noted that the RFID management modules 148, 150 on both the wireless devices 108 and RFID readers 102 continuously synchronize activity information and consolidates duplicate information. In other words as items are added/removed from the item list and as group members accept/change responsibilities for items, the activity profiles comprising this information are synchronized amongst the group members and duplicate information is removed.

Additionally, items/tasks associated with an activity can be referred to as "individual" items or "group" (shared) items. An individual item is an item that is only used by one member of the group and a group item is an item that is shared by two or more members of the group. For example, an individual item can be a book, toothbrush, comb, and the like. A group item can be a tent, lantern, cooler, bug repellant, and the like. In one embodiment, only items identified as "group" items are synchronized among the group members. This is because if one member forgets his individual item such as a book, the other members do not necessarily need to be notified of this event.

However, if a member forgets a group item such as a tent, the other members are notified because it affects more than just the member who forgot the item. The individual items are still monitored for, but the individual member is only notified of the status (present or not present) of individual items. As discussed above, a group member can notify the other group members that he/she is bringing a particular individual item. The other group members are presented with the option of monitoring that particular item. If any member selects to monitor that item, the individual item transitions into a group time. In an alternative embodiment, both individual and group items are synchronized in the group. In this embodiment, if a member forgets an individual item all members are notified of this event.

It should be noted that RFID enabled items that are to be monitored for a group activity can be manually selected by group members from an application such as a calendar application. For example, a user can use a calendar application to enter and select items/tasks that are to be monitored for. A group member can user a calendar application to enter a task such as "bring tent for camping trip". This entry can be used to generate a "tent" item that is added to the list of items being monitored for the camping trip. Also, a list of RFID enabled items can be automatically generated by an application based on prior group activities, environmental scan of items (identifying RFID enabled items in the vicinity and selecting items associated with the current group activity), a user manually selecting items from a prior group activity, a user appending a list of items from a prior group activity of the like.

The RFID readers 102, 104, 106 can reside anywhere a user desires. For the camping example, a group member can have an RFID reader 102 located in the trunk of his/her automobile. The monitoring of RFID enabled items 110 can be triggered in various ways. For example, the RFID reader 102 can continually monitor for RFID enabled items 110 or a member can manually start the monitoring at an RFID reader 102. Alternatively, the RFID reader 102 can start monitoring based on an external event such as the car moving, ignition starting, or a calendar event occurring. For example, the RFID reader 102 can include an internal clock which is monitored by the RFID monitoring module 124. An activity profile 126 can be associated with specific dates and/or time intervals, and based on this information, the RFID reader 102 can start monitoring. For example, if the user has associated the "camping" profile with Oct. 10, 2007 at 7:00 am, the RFID reader 102 can starting monitoring for the items 110 associated with the "camping" profile on Oct. 10, 2007 at 7:00 am.

As the group member packs the car, the RFID reader 102 detects the RFID enabled items 110 and updates a detection list, which is a list of items that has entered and/or exited the trunk of the car. The RFID reader 102 can also update a detection list at the wireless device 108. For example, as items are detected entering or exiting the trunk, a list on the RFID reader 102 and/or the wireless device can display the name of the item entering or exiting. This list can be displayed in real-time or displayed at given intervals.

For example, based on the current time, date, location, or the like, the RFID begins monitoring for the RFID enabled items associated with the camping activity. The monitoring occurs at each member's RFID reader(s). As each RFID enabled item is detected, the RFID management module 148, 150 cross-references the camping activity profile to determine if the detected item is an individual item or a group item. If the detected item is an individual item, its status is kept locally and not sent out to the other group members. If the detected item is a group item then its status information is sent out to the other group members.

Also, if the RFID reader 102 detects an RFID enabled item 110 that is not associated with a currently monitored for activity profile or if a profile is currently not being monitored for, the RFID reader 102 cross-references its profile database 120 to determine if an activity profile 126 is associated with the detected item(s) 110. If an activity profile 126 is associated with the detected item(s) 110, the RFID reader 102 can automatically start monitoring for all the items in the profile 126. In another embodiment, the RFID reader 102 can prompt the user either though its own interface 118 of the interface 132 of the wireless device 108 to determine if it should start monitoring for all the items in the profile 126.

If a group member chooses to associate a newly detected item with the camping activity, the user is prompted to classify the item as an individual item or a group item. If the item is classified as an individual item the camping activity profile is updated locally and this information is not transmitted to the other group members. However, if the item is classified as a group item, the RFID item list of the other group members are updated to include this new item.

Additionally, the user can query the RFID reader 102 either through the wireless device 108 or the RFID reader 102 for a status update of the detected individual items, group items, or both. For example, the list of detected items can be displayed to the user. In one embodiment, the other wireless devices 140, 142 or RFID readers 104, 106 associated with the other group members do not have to be queried because the detection lists are updated in real-time. In other words, every time a group item is detected the detection lists of all the group members are updated. Alternatively, with respect to the above example, a list of items that have exited the trunk can also be displayed. After the RFID reader 102 has completed monitoring RFID enabled items 110, a final list of detected items can be displayed to the user. It should be noted that this list can display all detected individual/group items and/or missing individual/group items (when a profile was being monitored for).

If an item is detected as missing, the RFID management module 148, 150, in one embodiment, can prompt another group member to bring the item if possible when the currently assigned member is no longer able to bring the item. For example, if the currently assigned member has not left his/her house, the current member can go and get the item when notified that it is missing. However, if the currently assigned member has left his/her house the current member may be no longer able to bring the item. Therefore, another group member can be prompted to bring the missing item.

The RFID reader 102 can determine when to finish monitoring either by determining that all items in a profile have been detected, by being manually stopped by a user, or detecting an external event such as the trunk closing or the car ignition starting (in the above example). These external events can also trigger a status update to be sent to the wireless device 108, displayed at the RFID reader 102, or sent to the other group members. It should be noted that the present invention is not limited to notifying the user via the RFID reader 102 or the wireless device 108. For example, other electronic devices such as a car information center (e.g., car radio, dashboard display), PDA, watch, and the like can also be configured to display the RFID related information.

As can be seen, the present invention provides an advantageous RFID tracking system capable of monitoring and managing group activities. Members of a group activity can be assigned responsibility for one or more RFID enabled items. Each member of the group is notified of the status associated with each of these group items. For example, if an RFID reader of one group member detects that a tent is not in the member's car and the tent is a group item, each group member is notified that the tent is missing. The present invention also monitors and tracks individual items. However, the status of these items is only displayed to the associated user and not the entire group.

Group Activity Profile Examples

FIG. 2 and FIG. 3 show examples of group activity profiles 126. FIG. 2 is an example of a group activity profile 126 residing on the wireless device A 108 and/or the RFID reader A 102 associated with the originating user discussed above. FIG. 2 shows a group activity user profile 126 comprising various columns of information. For example, the group activity profile 126 of FIG. 2 includes a "Task" field 202, an "Item" field 204, a "Shared" indication field 206, and an "Assigned" field 208. It should be noted that these fields are not limiting and one or more fields can be added/removed.

The Task field 202 includes any associated tasks that are associated with the group activity. For example, a first task entry 210 "Bring tent" is included under the Task field 202. The Item field 204 includes entries identifying RFID enabled items that are associated with the group activity. For example FIG. 2 shows an entry 212 for a Tent, an entry 214 for a toothbrush, an entry 216 for a lantern, an entry 218 for keys, an entry 220 for a wallet, and an entry 222 for a radio. The Shared field 206 includes entries indicating whether an item in the Item field 204 is a group/shared item or an individual item. For example, the Tent entry 212 has a corresponding entry 224 under the Shared field 206 indicating that it is a group/shared item.

The toothbrush entry 214 has a corresponding entry 226 under the Shared field 206 indicating that it is an individual item. The Assigned field 208 includes entries indicating the group member who is responsible for the associated item. For example, The Assigned field 208 has an entry 228 indicating that Member 2 is responsible for the tent item. The Assigned field 208 also includes an entry 230 indicating that the originating member is responsible for the toothbrush.

As discussed above, FIG. 2 is an example of an activity profile residing on the wireless device 108 or RFID reader 102 associated with the originating user. FIG. 3 shows a group activity profile for the same group activity as the profile in FIG. 2, but the profile of FIG. 3 resided on the wireless device 140 and/or the RFID reader 104 of group member 2. As can bee seen from the profile in FIG. 3 includes the same fields as that of FIG. 2 and also includes all of the group/shared items. However, the individual items in the profile of FIG. 2 are not included in the profile of FIG. 3. In fact, the profile of FIG. 3 includes different individual item entries 302, 304. This is because the individual items are not shared and are only displayed to the individual user. However, in another embodiment, the individual items in a profile can be displayed to all group members. In this embodiment, both group activity profiles of FIG. 2 and FIG. 3 include all individual items.

User Interface Examples

FIGS. 4-6 are block diagrams illustrating graphical user interfaces 118, 132 according to one or more embodiments of the present invention. In particular, FIGS. 4-6 show a GUI 402 that is displayed on the wireless devices 108, 140, 142. However, the following discussion is also applicable to the GUI of the RFID readers 102, 104, 106. FIG. 4 shows a GUI 402 comprising group item detection status. For example, the GUI 132 includes a Group Item field 404 and a Status field 406. The Group Item field 404 includes entries such as entry 408 "Tent" indicating a group item. The Status field 406 includes entries such as entry 410 "Detected" that displays whether or not the corresponding group item has been detected. The GUI of FIG. 4 is commonly displayed to each group member and can be dynamically updated in real-time as a group item is detected.

FIG. 5 shows a GUI 502 that is displayed on an individual member's wireless device 108 and not to all group members. In this example, the GUI 502 includes an Individual Item field 504 and a Status field 506. The Individual Item field 504 includes entries such as entry 508 "tooth brush" indicating an individual item. The Status field 506 includes entries such as entry 510 "Detected" that displays whether or not the corresponding individual item has been detected.

FIG. 6 is another embodiment of a GUI 602 that is displayed to all members of a group activity. The GUI 606 of FIG. 6 includes an Item field 604 and a Status field 606. The item field 404 includes entries including individual items and group items. For example, FIG. 6 shows an entry 610 "Tent" indicating a group item and an entry 614 "tooth brush" indicating an individual item. The Status field 606 includes entries such as entry 612 "Detected" that displays whether or not the corresponding item has been detected.

Exemplary Wireless Device

Figure 7:
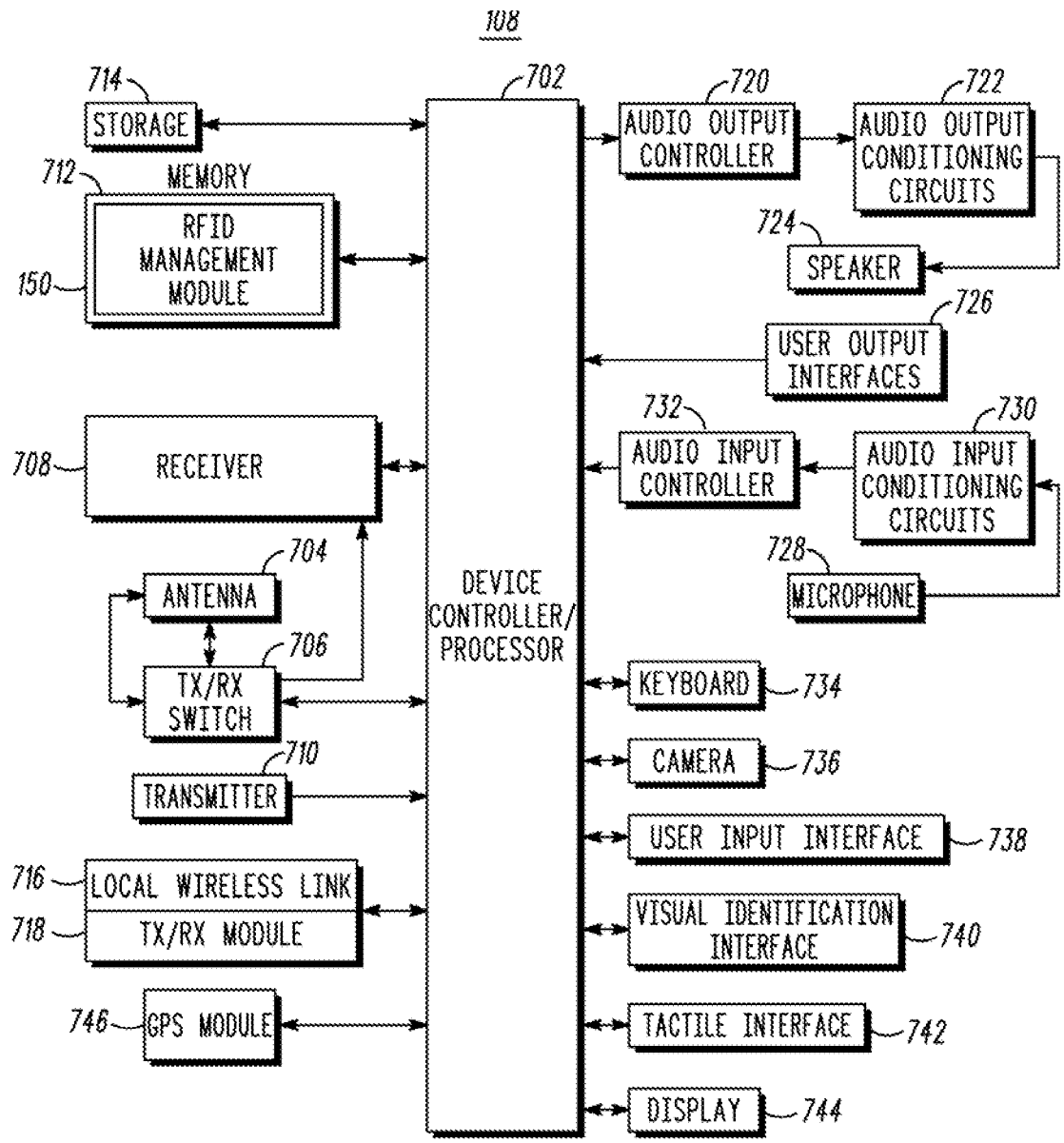
FIG. 7 is a block diagram illustrating a wireless communication device according to an embodiment of the present invention.

FIG. 7 is a block diagram illustrating a detailed view of the wireless device 108 according to an embodiment of the present invention. The wireless communication device can either be a single mode or dual mode phone (i.e., can communicate either on a circuit services network or a packet data network). The wireless device 108 operates under the control of a device controller/processor 702, that controls the sending and receiving of wireless communication signals. In receive mode, the device controller 702 electrically couples an antenna 704 through a transmit/receive switch 706 to a receiver 708. The receiver 708 decodes the received signals and provides those decoded signals to the device controller 702.

In transmit mode, the device controller 702 electrically couples the antenna 704, through the transmit/receive switch 706, to a transmitter 710. The device controller 702 operates the transmitter and receiver according to instructions stored in the memory 712. These instructions include, for example, a neighbor cell measurement-scheduling algorithm. The memory 712 also includes the RFID management module 150 that includes the RFID information module 130. The memory also includes the calendar 152 (not shown in FIG. 7) if available, one or more activity profiles 126 (not shown in FIG. 7), and the remaining components which have been discussed above with respect to FIG. 1. In one embodiment, the receiver 708 and the transmitter 710 are also capable of communicating with an RFID reader 102 for communicating and receiving RFID enabled item information, activity profiles, and the like. For example, the receiver 708 and the transmitter 710 can receive and send 802.11, 802.16 communications. Although shown as residing in the memory 712, one or more of these components can be implemented as hardware within the wireless device 108. The wireless device 108, also includes non-volatile storage memory 714 for storing, for example, an application waiting to be executed (not shown) on the wireless device 108.

The wireless device 108, in this example, also includes a local wireless link 716 that allows the wireless device 108 to directly communicate with another wireless device without using a wireless network (not shown). The local wireless link 716, for example, is provided by Bluetooth, Infrared Data Access (IrDA) technologies, or the like. The local wireless link 716 also includes a local wireless link transmit/receive module 718 that allows the wireless device 108 to directly communicate with another wireless communication device such as wireless communication devices communicatively coupled to personal computers, workstations, and the like. The local wireless link 716, in one embodiment, also allows the wireless device 108 to communicate with an RFID reader 102 for communicating and receiving RFID enabled item information, activity profiles, and the like The wireless device 108 of FIG. 7 further includes an audio output controller 720 that receives decoded audio output signals from the receiver 708 or the local wireless link transmit/receive module 718. The audio controller 720 sends the received decoded audio signals to the audio output conditioning circuits 722 that perform various conditioning functions. For example, the audio output conditioning circuits 722 may reduce noise or amplify the signal. A speaker 724 receives the conditioned audio signals and allows audio output for listening by a user. The audio output controller 720, audio output conditioning circuits 722, and the speaker 724 also allow for an audible alert to be generated notifying the user of a missed call, received messages, or the like. The wireless device 108 further includes additional user output interfaces 726, for example, a head phone jack (not shown) or a hands-free speaker (not shown).

The wireless device 108 also includes a microphone 728 for allowing a user to input audio signals into the wireless device 108. Sound waves are received by the microphone 728 and are converted into an electrical audio signal. Audio input conditioning circuits 730 receive the audio signal and perform various conditioning functions on the audio signal, for example, noise reduction. An audio input controller 732 receives the conditioned audio signal and sends a representation of the audio signal to the device controller 702.

The wireless device 108 also comprises a keyboard 734 for allowing a user to enter information into the wireless device 108. The wireless device 108 further comprises a camera 736 for allowing a user to capture still images or video images into memory 712. Furthermore, the wireless device 108 includes additional user input interfaces 738, for example, touch screen technology (not shown), a joystick (not shown), or a scroll wheel (not shown). In one embodiment, a peripheral interface (not shown) is also included for allowing the connection of a data cable to the wireless device 108. In one embodiment of the present invention, the connection of a data cable allows the wireless device 108 to be connected to a computer or a printer.

A visual notification (or indication) interface 740 is also included on the wireless device 108 for rendering a visual notification (or visual indication), for example, a sequence of colored lights on the display 744 or flashing one ore more LEDs (not shown), to the user of the wireless device 108. For example, a received multimedia message may include a sequence of colored lights to be displayed to the user as part of the message. Alternatively, the visual notification interface 740 can be used as an alert by displaying a sequence of colored lights or a single flashing light on the display 744 or LEDs (not shown) when the wireless communication device 104 receives a message, or the user missed a call.

The wireless device 108 also includes a tactile interface 742 for delivering a vibrating media component, tactile alert, or the like. For example, a multimedia message received by the wireless device 108, may include a video media component that provides a vibration during playback of the multimedia message. The tactile interface 742, in one embodiment, is used during a silent mode of the wireless device 108 to alert the user of an incoming call or message, missed call, or the like. The tactile interface 742 allows this vibration to occur, for example, through a vibrating motor or the like.

The wireless device 108 also includes a display 740 for displaying information to the user of the wireless communication device 104 and an optional Global Positioning System (GPS) module 746. The optional GPS module 746 determines the location and/or velocity information of the wireless device 108. This module 746 uses the GPS satellite system to determine the location and/or velocity of the wireless device 108. Alternative to the GPS module 746, the wireless device 108 may include alternative modules for determining the location and/or velocity of wireless device 108, for example, using cell tower triangulation and assisted GPS.

Exemplary RFID Reader

Figure 8:
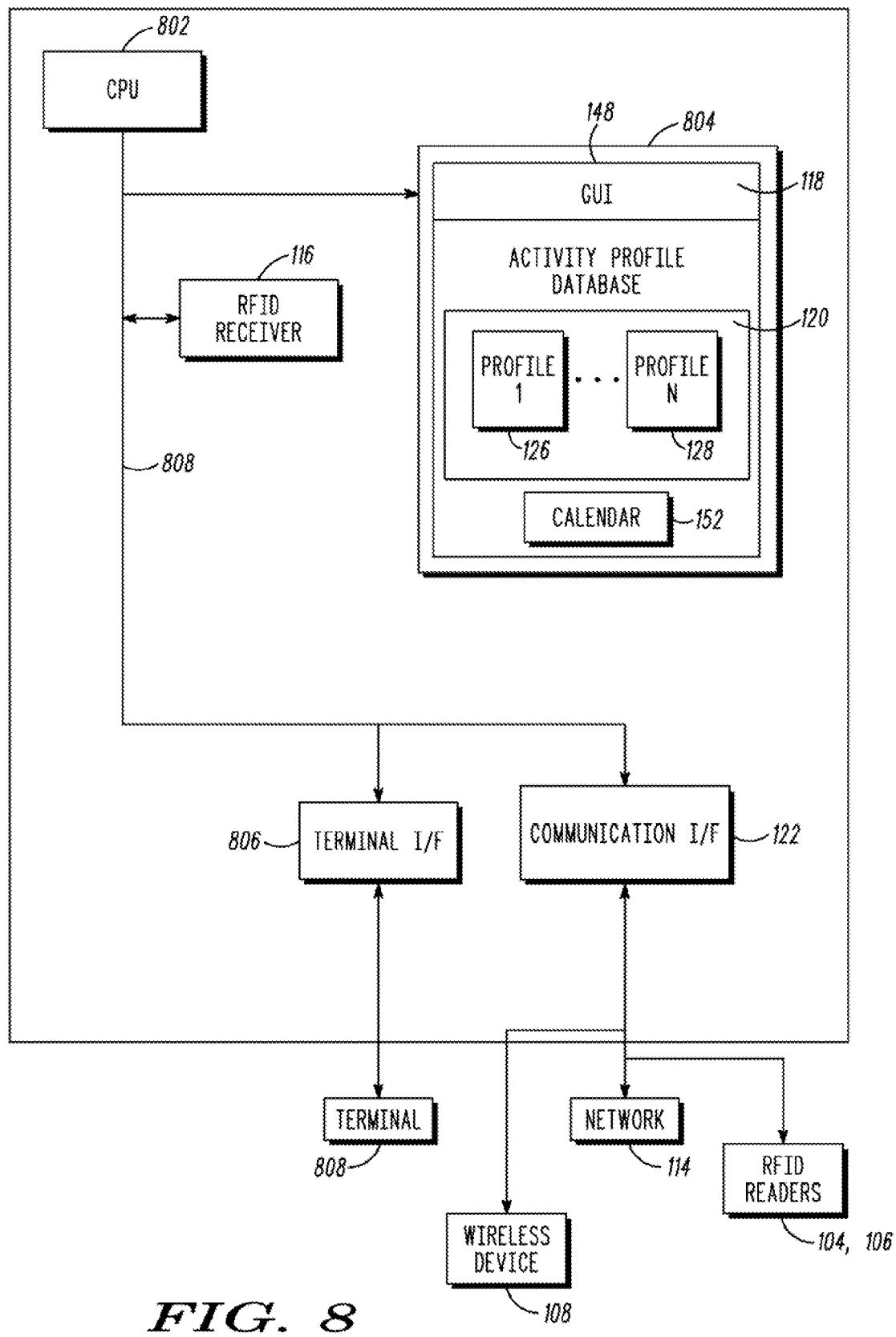
FIG. 8 is a block diagram illustrating a information processing system according to an embodiment of the present invention.

FIG. 8 is a block diagram illustrating a detailed view of the RFID reader 102 according to an embodiment of the present invention. The RFID reader 102 includes a processor 802 that is communicatively connected to a main memory 804 (e.g., volatile memory), a terminal interface 806, the communication interface 122, and the RFID receiver 116. A system bus 808 interconnects these system components. The main memory 804, in one embodiment, includes portions of the RFID management module 148 such as the GUI 118, calendar 152, and the remaining components discussed above with respect to FIG. 1. As discussed above, the RFID receiver 116 comprises part of the RFID monitoring module 124 and detects the presence of RFID enabled items 110.

The GUI 118 allows for a user to interact with the RFID reader 102. For example, a user can be notified of detected/missing RFID enabled items; a user can create activity policies 126; make various selections; and the like through the GUI 118. The GUI is communicatively coupled to display hardware (not shown). It should be noted that the RFID reader 102 does not need to include a display or the GUI 118. The main memory 804, in one example, also includes an activity profile database 120 for storing one or more activity profiles 126, as discussed above. Although shown as residing in the memory 806, one or more of these components can be implemented as hardware within the RFID reader 102.

Terminal interface 806 is used to directly connect one or more terminals 808 such as an information processing system to the RFID reader 102. The communication interface 122 provides a communication mechanism between other RFID readers 104, 106, the wireless device 108, and the network 114. The communication interface 122 can be wired and/or wireless comprising Ethernet, 802.11, 802.16, Bluetooth, IrDA, or the like. Embodiments of the present invention are able to be adapted to work with any data communications connections including present day analog and/or digital techniques or via a future networking mechanism.

It should be noted that a user can designate one or more RFID readers 102 in a set of RFID readers to monitor for certain items or activities. For example, an RFID reader 102 in a trunk of a car can be assigned to monitor for RFID enabled items associated with a "camping" activity, while an RFID reader at a front door of a hose can be assigned to a "leave for work" activity. Also, one or more RFID readers 102 can be communicatively coupled to one another, thereby creating an RFID reader network. These RFID readers 102 can then pass information to one another.

Process of Configuring a Group Activity

Figure 9:
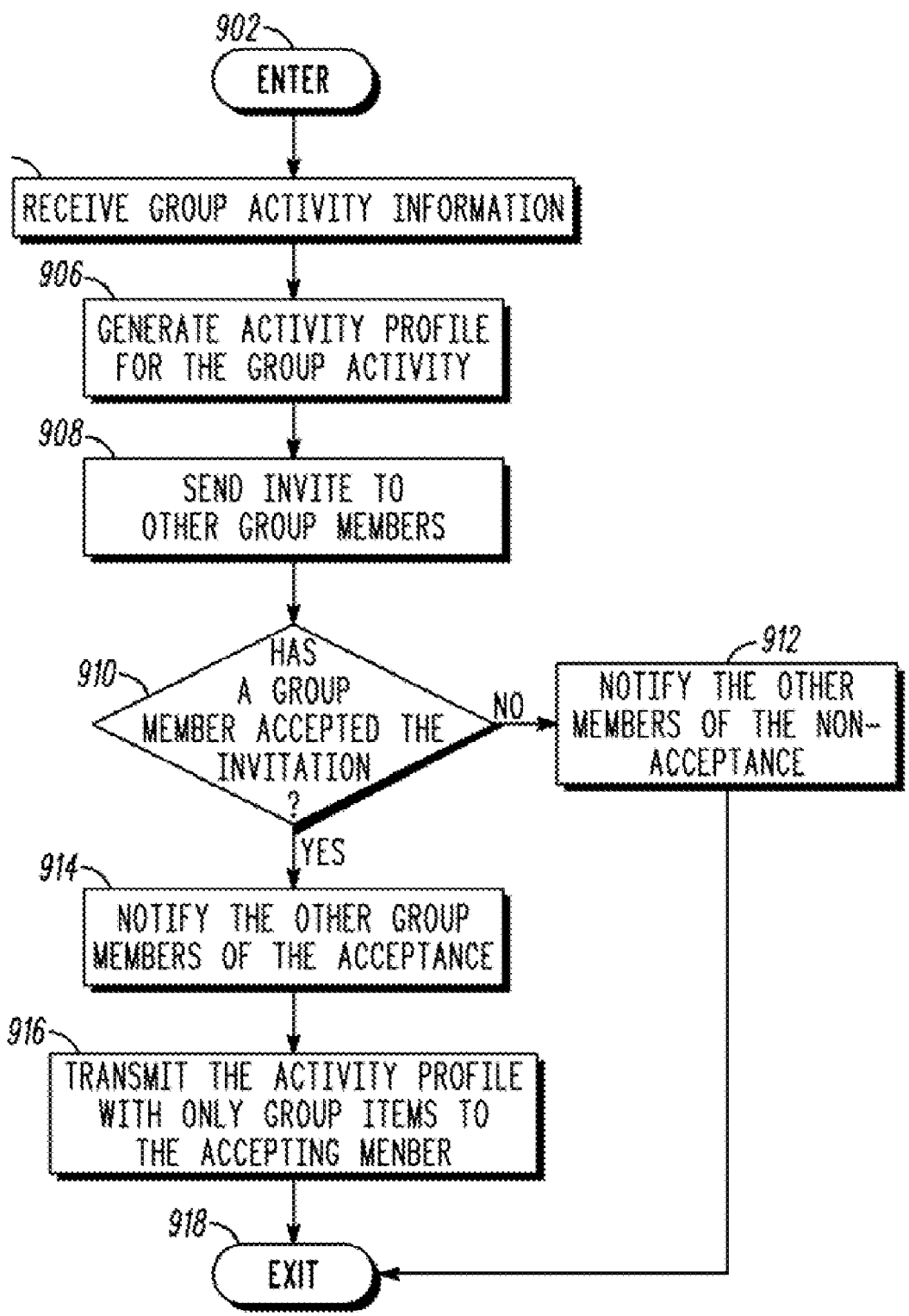
FIG. 9 is an operational flow diagram illustrating a process of configuring a group activity according to an embodiment of the present invention.

FIG. 9 is an operational flow diagram illustrating a process of configuring a group activity according to an embodiment of the present invention. The operational flow diagram of FIG. 9 begins at step 902 and flows directly to step 904. The RFID management module 148 at an RFID reader 102 (or a wireless device 108), at step 904, receives group activity information. The group activity information can include invitees, time/location information, group items, individual items, and the like. The RFID management module 148, at step 906, generates an activity profile 126 for the group activity. The RFID management module 148, at step 908, sends an invite to the group members.

The RFID management module 148, at step 910, determines if a group member has accepted the invitation. If the result of this determination is negative, the RFID management module 148, at step 912, notifies the group members that another group member has declined the invitation. The control flow then exits at step 918. If the result of this determination is positive, the RFID management module 148, at step 914, notifies the group members of the invitation acceptance by the accepting member. The RFID management module 148, at step 916, transmits the activity profile 126 with only group member items to the accepting member. The control flow then exits at step 918.

Process for Monitoring the Presence Status of Group Items

Figure 10:
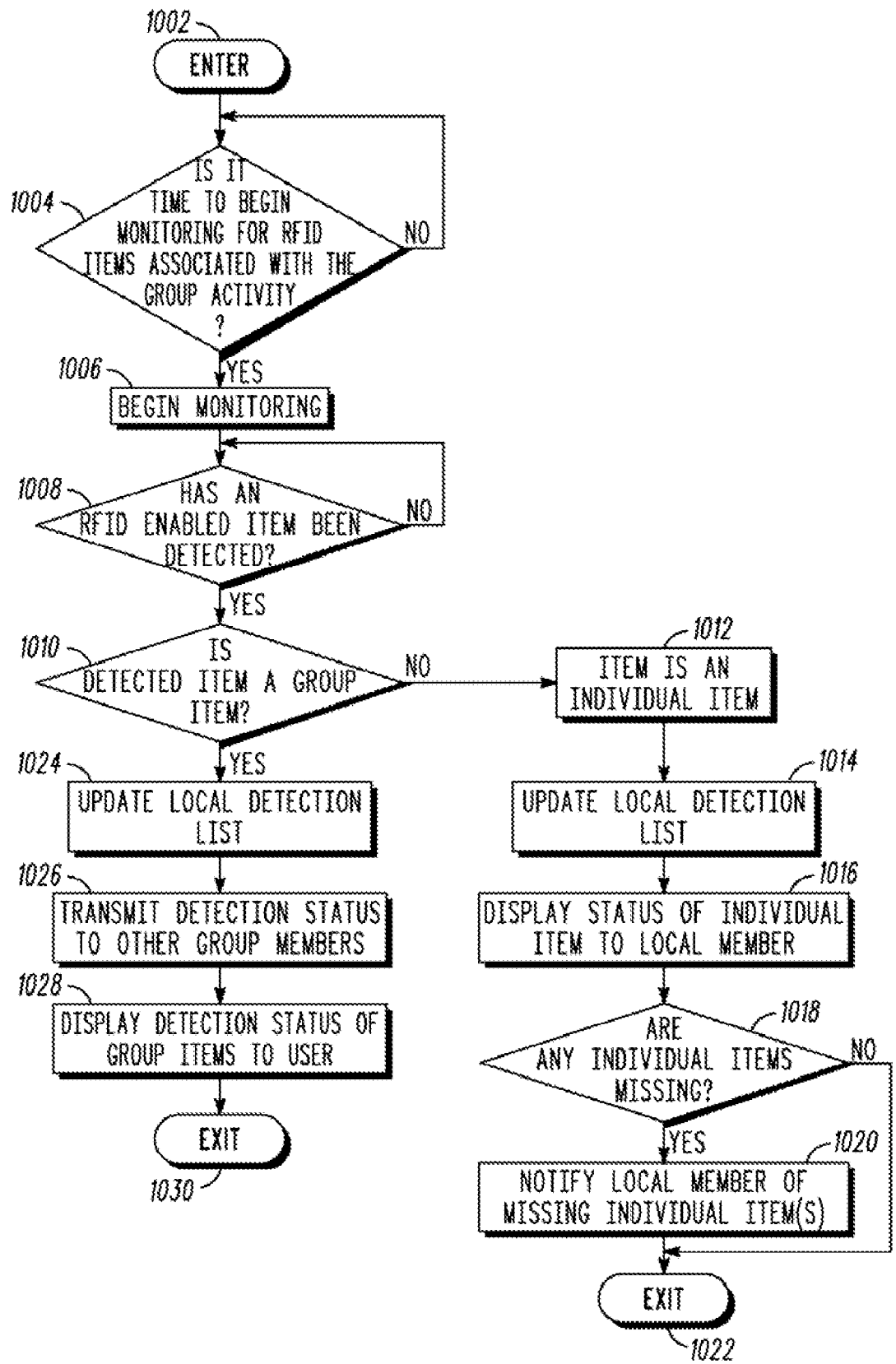
FIG. 10 is an operational flow diagram illustrating a process of monitoring the presence status of RFID enabled items associated with a group activity according to an embodiment of the present invention.

FIG. 10 is an operational flow diagram illustrating a process of monitoring the presence status of group items according to an embodiment of the present invention. The operational flow diagram of FIG. 10 begins at step 1002 and flows directly to step 1004. The RFID management module 148, at step 1004, determines if monitoring for RFID enabled items associated with a group activity should begin. For example, the RFID management module 148 can monitor a calendar, receive input from a user, or the like. If the result of this determination is negative, the control flow returns to step 1004. If the result of this determination is positive, the RFID management module 148, at step 1006 begins monitoring.

The RFID management module 148, at step 1008, determines if RFID enabled items have been detected. For example, the RFID management module 148 determines if it has detected an RFID associated with RFID enabled item for a group activity. If the result of this determination is negative, the control returns to step 1008. If the result of this determination is positive, the RFID management module 148, at step 1010, determines if a group item has been detected. If the result of this determination is negative, the RFID management module 148, at step 1012, determines that the detected RFID enabled item is an individual item. The RFID management module 148, at step 1014, updates a local detection list, which can be part of the corresponding activity profile 126. The RFID management module 148, at step 1016, displays the status of the individual item to the local member.

The RFID management module 148, at step 1018, determines if any individual items are missing, if the result of this determination is negative, the control flow exits at step 1022. If the result of this determination is positive, the RFID management module 148, at step 1020, notifies the local member that one or more individual items are missing. If the determination at step 1010 is positive, the RFID management module 148, at step 1024, updates a detection list which can be part of the activity profile 126.

The RFID management module 148, at step 1026, transmits the detection status of the detected group item to all group members. The RFID management modules at the wireless devices 108, 140, 142 and/or the RFID readers 102, 104, 106, at step 1028, display the detection status of the group items to the group members. The control flow then exits at step 1030.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an electronic device, for monitoring radio-frequency identification (RFID) enabled items associated with a group activity and RFID enabled items associated with individuals, wherein multiple electronic devices monitor the RFID enabled items, the method comprising:
  receiving a set of radio frequency IDs representing a set of radio frequency ID enabled items to be monitored, wherein the set of radio frequency enabled items are associated with at least one group activity or at least one individual;
  determining, for each radio frequency ID enabled item, that the radio frequency ID enabled item is associated with an individual or a group, wherein only items associated with the group are synchronized among the multiple electronic devices, and items associated with the individual are only monitored by the electronic device;
  sensing a status of RFID enabled items based on at least one condition;
  synchronizing among the multiple electronic devices, a status of only items associated with the group; and
  monitoring, radio frequency ID enabled items that are both associated with the individual and the group based on said status.

2. The method of claim 1, further comprising
  determining that a radio frequency ID enabled item has been designated as an individual item by a group member;
  determining that at least one other group member has selected to monitor the radio frequency ID enabled item designated as an individual item; and
  changing a monitoring status associated with the radio frequency ID enabled item from an individual item to a group item.

3. The method of claim 1, further comprising:
  communicating a monitored status of at least one of the set of radio frequency IDs representing the set of radio frequency ID enabled items to be monitored by at least one of
  directly with at least one electronic device associated with at least one individual in the group of individuals; and
  through at least one intermediate information processing system that then communicates the monitored status with the at least one electronic device.

4. The method of claim 1, wherein the receiving further comprises:
  receiving the set of radio frequency IDs representing the set of radio frequency ID enabled items to be monitored from at least one electronic device associated with one of the group of individuals and an individual in the group of individuals;
  determining, in response to the receiving, that another set of radio frequency IDs already resides in a memory;
  synchronizing the received set of radio frequency IDs with the another set of radio frequency IDs; and
  removing, in response to the synchronizing, any duplicate radio frequency ID existing between the received set of radio frequency IDs and the set of radio frequency IDs already residing in the memory.

5. The method of claim 1, wherein the items to be monitored are at least one of:
  designated to be monitored by at least one individual in the group of individuals via a calendar application; and
  automatically generated, via an application, based on at least one of a prior group activity and an environmental scan of items.

6. The method of claim 1, further comprising:
  determining, in response to the monitoring, if a presence of at least one item in the set of radio frequency ID enabled items is one of detected by detecting radio frequency identification and has failed to be detected by detecting radio frequency identification;
  wherein in response to the at least one item in the set of radio frequency ID enabled items is being detecting radio frequency identification;
    identifying, in response to the determining if the presence of the at least one item in the of radio frequency ID enabled items is detected, that the at least one detected item is associated with the group of individuals; and notifying, in response to the detected item being associated with a group of individuals, each individual in the group of individuals of a presence status associated with the at least one item;
wherein in response to the at least one item in the set of radio frequency ID enabled items failing to be detected by radio frequency identification;
identifying, in response to the determining that the presence of the at least one item in the set of radio frequency ID enabled items has failed to be detected, that the at least one item is associated with the group of individuals; and
notifying, in response to the item being associated with a group of individuals, each individual in the group of individuals that the at least one item has failed to be detected.

7. The method of claim 6, wherein the at least one of the notifying further includes:
wirelessly transmitting the presence status associated with the at least one item to a wireless device associated with each individual in the group of individuals; and
displaying the presence status associated with the at least one item via a graphical user interface on the wireless device.

8. The method of claim 1, further comprising:
determining, in response to the monitoring, if a presence of at least one item in the set of radio frequency ID enabled items is detected by detecting radio frequency identification; and
identifying, in response to the determining if the presence of the at least one item in the of radio frequency ID enabled items is detected, that the at least one detected item is associated with the individual; and
notifying, in response to the detected item being associated with the individual, only the individual of a presence status associated with the at least one item.

9. The method of claim 1, further comprising:
wirelessly sending an invitation request to each individual in the group of individuals for joining the at least one group activity.

10. The method of claim 9, further comprising:
determining that at least one individual in the group of individuals has declined the invitation request;
wirelessly notifying a remaining set of individuals in the group of individuals that the at least one individual has declined the invitation request;
determining that at least one individual in the group of individuals has accepted the invitation request;
wireless notifying a remaining set of individuals in the group of individuals that the at least one individual has accepted the invitation request; and
wireless transmitting at least a list of radio frequency ID enabled items associated with the group of individuals to at least one electronic device associated with the individual who has accepted the invitation request.

11. A radio-frequency identification (RFID) reader for monitoring RFID enabled items associated with a group activity and RFID enabled items associated with individuals, wherein multiple readers monitor the RFID enabled items, the radio-frequency ID reader comprising:
a memory;
a processor communicatively coupled to the memory; and
a radio-frequency ID management module communicatively coupled to the memory and the processor, the radio-frequency ID management module adapted to:
receiving a set of radio frequency IDs representing a set of radio frequency ID enabled items to be monitored, wherein the set of radio frequency enabled items are associated with at least one group activity or at least one individual;
determining, for each radio frequency ID enabled item, that the radio frequency ID enabled item is associated with an individual or a group, wherein only items associated with the group are synchronized among the multiple readers, and items associated with the individual are only monitored by the RFID reader corresponding to said individual;
sensing a status of RFID enabled items based on at least one condition;
synchronizing among the multiple readers, a status of only items associated with the group; and
monitoring radio frequency ID enabled items that are both associated with the individual and the group based on said status.

12. The radio-frequency ID reader of claim 11, wherein the radio-frequency ID management module is further adapted to:
determining, in response to the monitoring, if a presence of at least one item in the set of radio frequency ID enabled items is detected by detecting radio frequency identification; and
identifying, in response to the determining if the presence of the at least one item in the of radio frequency ID enabled items is detected, that the at least one detected item is associated with the group of individuals; and
notifying, in response to the detected item being associated with a group of individuals, each individual in the group of individuals of a presence status associated with the at least one item.

13. The radio-frequency ID reader of claim 11, wherein the radio-frequency ID management module is further adapted to:
determining, in response to the monitoring, if a presence of at least one item in the set of radio frequency ID enabled items has failed to be detected by detecting radio frequency identification; and
identifying, in response to the determining that the presence of the at least one item in the set of radio frequency ID enabled items has failed to be detected that the at least one item is associated with the group of individuals; and
notifying, in response to the item being associated with a group of individuals, each individual in the group of individuals of that the at least one item has failed to be detected.

14. The radio-frequency ID reader of claim 11, wherein the radio-frequency ID management module is further adapted to:
determining, in response to the monitoring, if a presence of at least one item in the set of radio frequency ID enabled items is detected by detecting radio frequency identification; and
identifying, in response to the determining if the presence of the at least one item in the of radio frequency ID enabled items is detected, that the at least one detected item is associated with the individual; and
notifying, in response to the detected item being associated with the individual, only the individual of a presence status associated with the at least one item.

15. The radio-frequency ID reader of claim 11, wherein the radio-frequency ID management module is further adapted to:
wirelessly sending an invitation request to each individual in the group of individuals for joining the at least one group activity;

determining that at least one individual in the group of individuals has declined the invitation request; and wireless notifying a remaining set of individuals in the group of individuals that the at least one individual has declined the invitation request.

16. The radio-frequency ID reader of claim 15, wherein the radio-frequency ID management module is further adapted to:

determining that at least one individual in the group of individuals has accepted the invitation request;

wireless notifying a remaining set of individuals in the group of individuals that the at least one individual has accepted the invitation request; and wireless transmitting at least a list of RFID enabled items associated with the group of individuals to at least one electronic device associated with the individual who has accepted the invitation request.

17. A wireless communication device for monitoring radio-frequency ID (RFID) enabled items associated with a group activity and RFID enabled items associated with individuals, wherein multiple wireless communication devices monitor the RFID enabled items, the wireless communication device comprising:
 a memory;
 a processor communicatively coupled to the memory; and
 a radio-frequency ID management module communicatively coupled to the memory and the processor, the radio-frequency ID management module adapted to:
  receiving a set of radio frequency IDs representing a set of radio frequency ID enabled items to be monitored, wherein the set of radio frequency enabled items are associated with at least one group activity;
  determining, for each radio frequency ID enabled item, that the radio frequency ID enabled item is associated with an individual or a group, wherein only items associated with the group are synchronized among the multiple wireless communication devices, and items associated with the individual are only monitored by the wireless communication device corresponding to said individual;
  sensing a status of RFID enabled items based on at least one condition;
 synchronizing among the wireless communication devices, a status of only items associated with the group; and
  monitoring radio frequency ID enabled items that are both associated with the individual and the group based on said status.

18. The wireless communication device of claim 17, wherein the radio-frequency ID management module is further adapted to:

determining, in response to the monitoring, if a presence of at least one item in the set of radio frequency ID enabled items is detected by detecting radio frequency identification;

identifying, in response to the determining if the presence of the at least one item in the of radio frequency ID enabled items is detected, that the at least one detected item is associated with the group of individuals; and notifying, in response to the detected item being associated with a group of individuals, each individual in the group of individuals of a presence status associated with the at least one item.

19. The wireless communication device of claim 17, wherein the radio-frequency ID management module is further adapted to:

determining, in response to the monitoring, if a presence of at least one item in the set of radio frequency ID enabled items has failed to be detected by detecting radio frequency identification; and identifying, in response to the determining that the presence of the at least one item in the set of radio frequency ID enabled items has failed to be detected, that the at least one item is associated with the group of individuals; and notifying, in response to the item being associated with a group of individuals, each individual in the group of individuals of that the at least one item has failed to be detected.

20. The wireless communication device of claim 17, wherein the radio-frequency ID management module is further adapted to:

determining, in response to the monitoring, if a presence of at least one item in the set of radio frequency ID enabled items is detected by detecting radio frequency identification;

identifying, in response to the determining if the presence of the at least one item in the of radio frequency ID enabled items is detected, that the at least one detected item is associated with the individual; and notifying, in response to the detected item being associated with the individual, only the individual of a presence status associated with the at least one item.

\* \* \* \* \*

UNITED STATES PATENT AND TRADEMARK OFFICE
CERTIFICATE OF CORRECTION

| | | |
|---|---|---|
| PATENT NO. | : 7,688,208 B2 | Page 1 of 1 |
| APPLICATION NO. | : 11/740634 | |
| DATED | : March 30, 2010 | |
| INVENTOR(S) | : Schuler et al. | |

It is certified that error appears in the above-identified patent and that said Letters Patent is hereby corrected as shown below:

IN THE SPECIFICATION

1. In Column 6, Line 25, delete "RIFD" and insert -- RFID --, therefor.
2. In Column 8, Line 7, delete "pre-select select" and insert -- pre-select --, therefor.
3. In Column 12, Line 57, delete "like" and insert -- like. --, therefor.

IN THE CLAIMS

4. In Column 16, Line 10, in Claim 2, delete "comprising" and insert -- comprising: --, therefor.
5. In Column 16, Line 64, in Claim 6, delete "the of" and insert -- the --, therefor.
6. In Column 17, Line 31, in Claim 8, delete "the of" and insert -- the --, therefor.
7. In Column 18, Line 26, in Claim 12, delete "the of" and insert -- the --, therefor.
8. In Column 18, Line 42, in Claim 13, delete "detected" and insert -- detected, --, therefor.
9. In Column 18, Line 56, in Claim 14, delete "the of" and insert -- the --, therefor.
10. In Column 20, Line 9, in Claim 18, delete "the of" and insert -- the --, therefor.
11. In Column 20, Line 42, in Claim 20, delete "the of" and insert -- the --, therefor.

Signed and Sealed this
Fifteenth Day of May, 2012

David J. Kappos
*Director of the United States Patent and Trademark Office*